April 8, 1924.
C. A. ROWLEY
1,489,852
DRAWING CONTINUOUS SHEET GLASS
Filed May 11, 1921   5 Sheets-Sheet 1
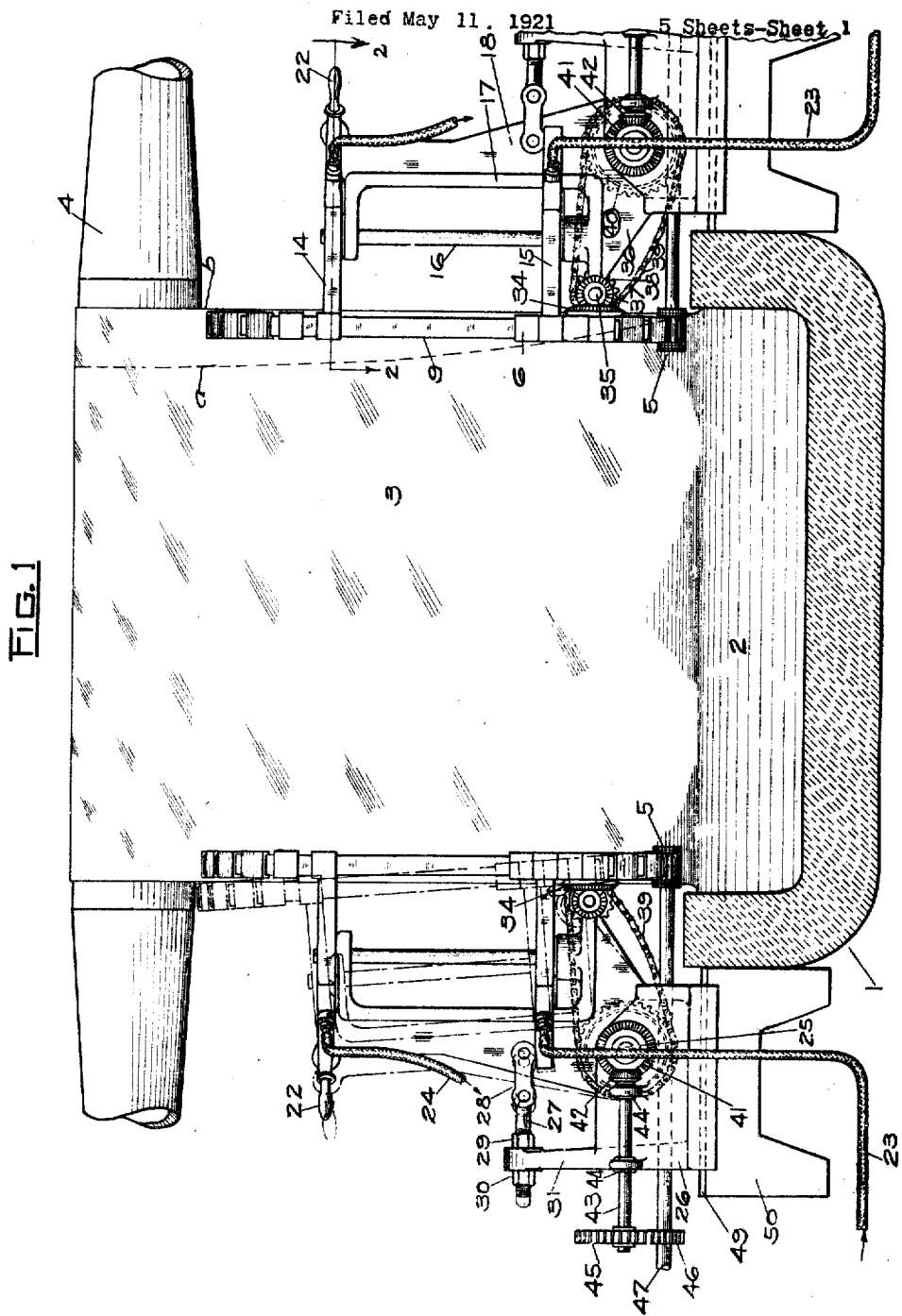
INVENTOR
Clifford A. Rowley April 8, 1924.
C. A. ROWLEY
1,489,852
DRAWING CONTINUOUS SHEET GLASS
Filed May 11, 1921     5 Sheets-Sheet 2
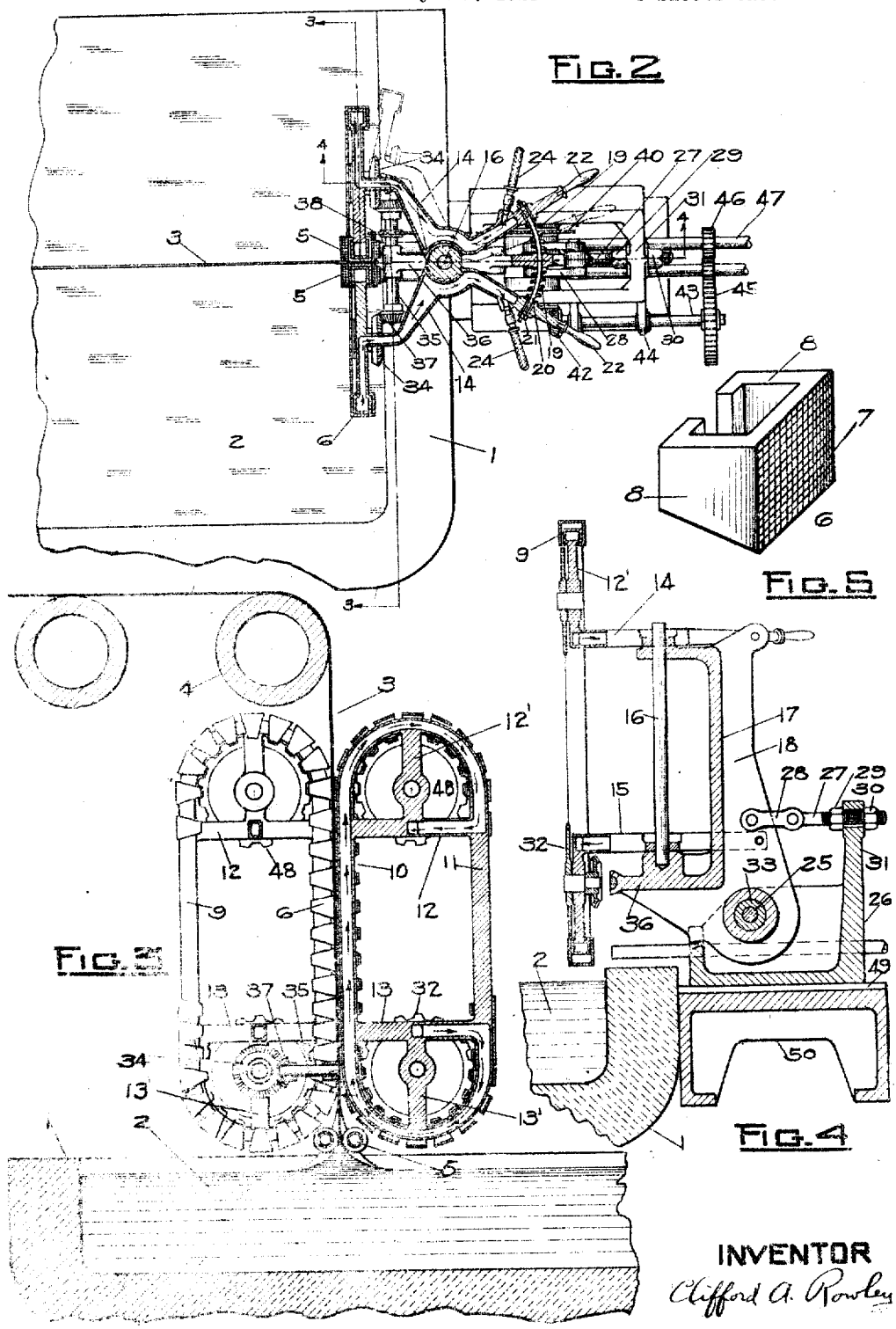
INVENTOR
Clifford A. Rowley April 8, 1924.
C. A. ROWLEY
1,489,852
DRAWING CONTINUOUS SHEET GLASS
Filed May 11, 1921      5 Sheets-Sheet 3
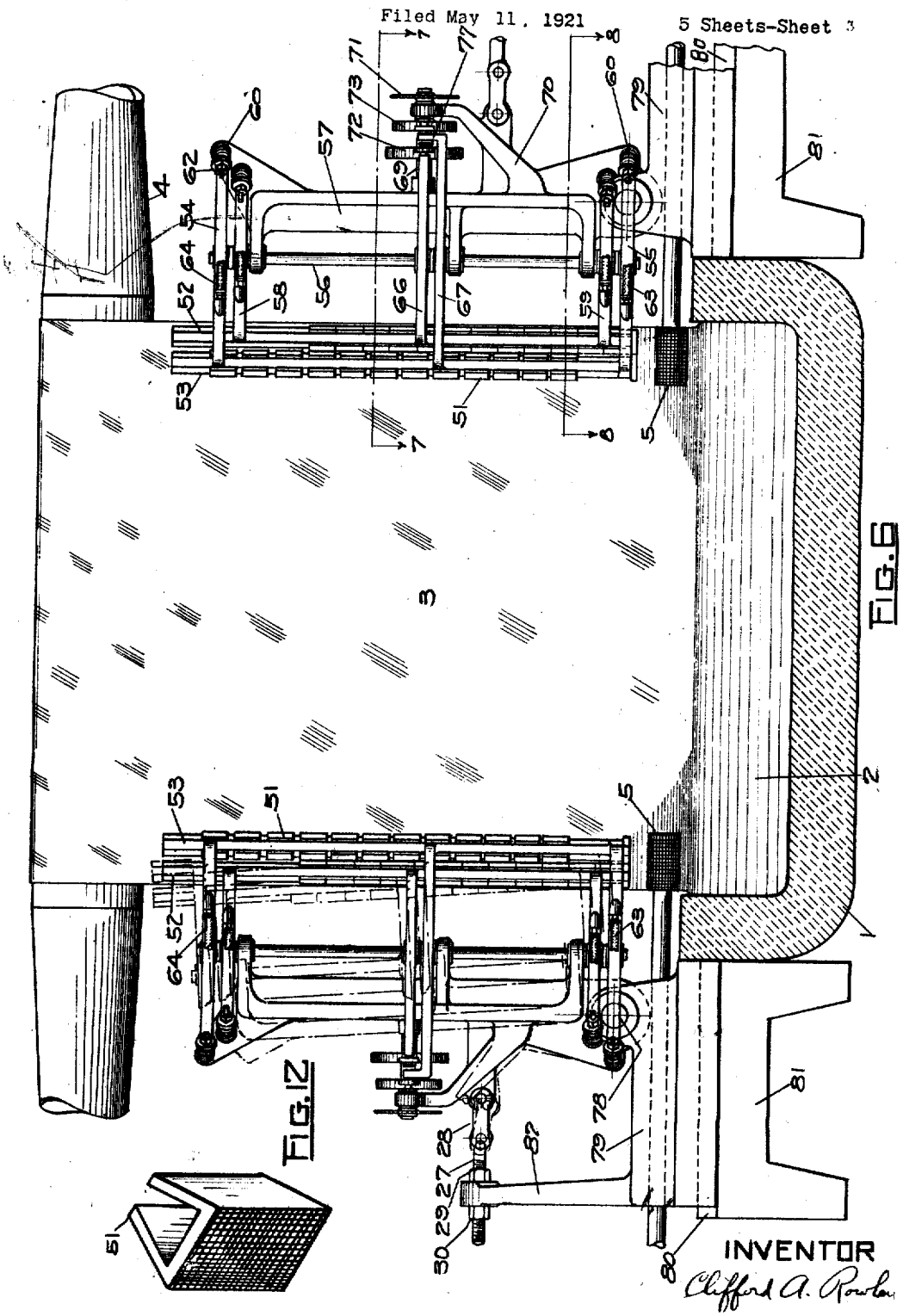
INVENTOR
Clifford A. Rowley April 8, 1924.
C. A. ROWLEY
1,489,852
DRAWING CONTINUOUS SHEET GLASS
Filed May 11, 1921
5 Sheets-Sheet 4
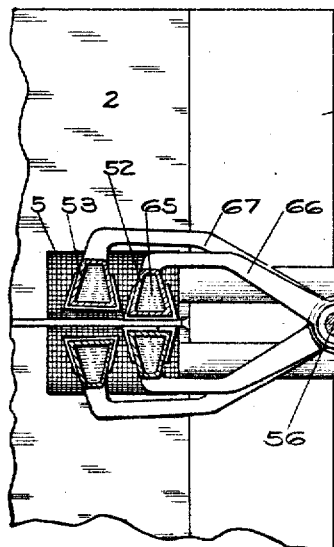
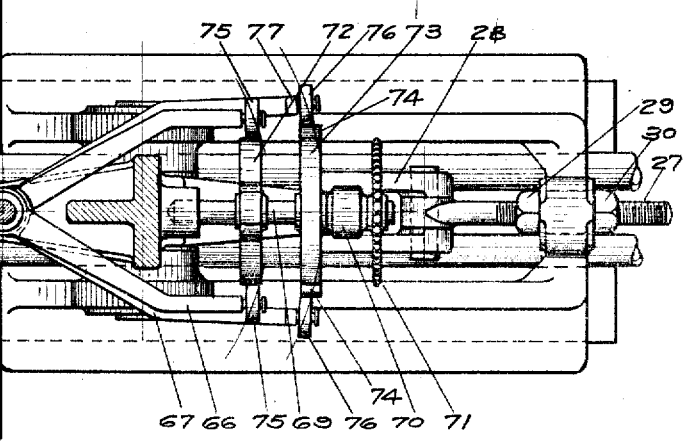
Fig. 7
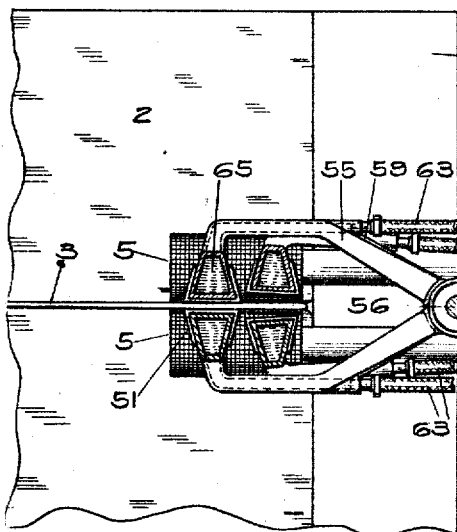
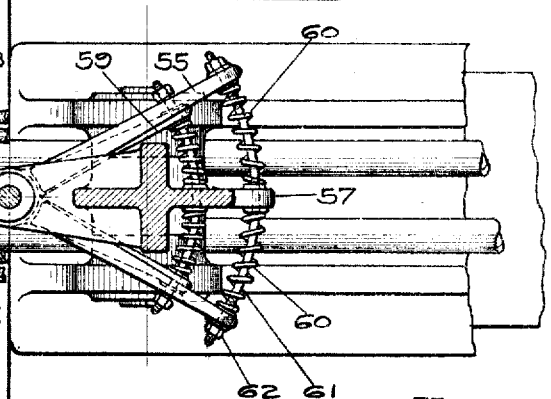
Fig. 8
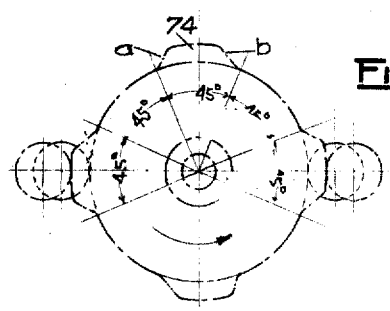
Fig. 9
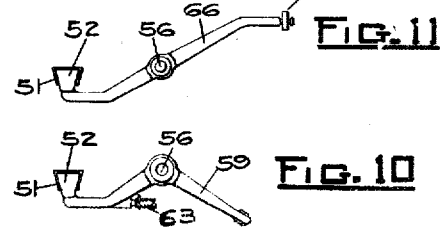
Fig. 11
Fig. 10
INVENTOR
Clifford A. Rowley April 8, 1924.

C. A. ROWLEY 1,489,852

DRAWING CONTINUOUS SHEET GLASS

Filed May 11, 1921   5 Sheets-Sheet 5

INVENTOR
Clifford A. Rowley

Patented Apr. 8, 1924.

1,489,852

UNITED STATES PATENT OFFICE.

CLIFFORD A. ROWLEY, OF TOLEDO, OHIO, ASSIGNOR TO THE LIBBEY-OWENS SHEET GLASS COMPANY, OF TOLEDO, OHIO, A CORPORATION OF OHIO.

DRAWING CONTINUOUS SHEET GLASS.

Application filed May 11, 1921. Serial No. 468,618.

*To all whom it may concern:*

Be it known that I, CLIFFORD A. ROWLEY, a citizen of the United States, residing at Toledo, in the county of Lucas and State of Ohio, have invented new and useful Improvements in Drawing Continuous Sheet Glass, of which the following is a specification.

This invention is an improvement in the art of drawing sheet glass, and relates more particularly to a method and apparatus for maintaining the width of the sheet, and stretching the sheet laterally, while the sheet is still in process of formation and in a plastic condition.

While this invention is not limited to use with any one system of producing sheet glass, it is illustrated in connection with an apparatus of the general type set forth in the patent to Colburn, 1,248,809, granted Dec. 4, 1917. In this system a continuous sheet of glass is drawn upwardly from a bath of molten glass, and then, while still in a semi-plastic condition, although substantially set in its final sheet form, is bent into a horizontal plane and carried off through a suitable drawing mechanism and into a leer. As is well-known in this art, some means must be provided to maintain the width of the drawn sheet, otherwise it will gradually narrow away until no sheet is left. The present invention discloses a mechanism for holding the sheet to substantially its initial width throughout the period in which it is being stretched longitudinally, and becoming set in substantially its final form. The mechanism may also be adjusted as desired, or found necessary, to impart an additional lateral stretch to the sheet during this period. Specifically, the invention employs a series of independent pairs of gripping members which engage and move with the sheet during this formation period, allowing the sheet to extend itself or stretch longitudinally, but preventing the narrowing action which would naturally accompany this longitudinal extension.

The invention will be better understood from the following detailed description of certain forms of apparatus by which this invention may be carried into practice.

While many different variations of the basic idea may be devised, two approved forms of apparatus are here disclosed.

In the accompanying drawings:

Fig. 1 is an elevation of the width-maintaining units as applied to the opposite edges of the sheet, the pot from which the sheet is drawn being shown in transverse vertical section.

Fig. 2 is a horizontal section through one of the width-maintaining assemblies, the section being taken substantially on the line 2—2 of Fig. 1.

Fig. 3 is a vertical section, taken substantially on the line 3—3 of Fig. 2, showing two cooperating series of gripping members in engagement with the sheet edge.

Fig. 4 is a partial vertical section taken substantially on the line 4—4 of Fig. 2.

Fig. 5 is a perspective view of one of the gripping members.

Fig. 6 is an elevation similar to Fig. 1, of another form of the invention.

Fig. 7 is a horizontal section, taken substantially on the line 7—7 of Fig. 6.

Fig. 8 is a horizontal section taken substantially on the line 8—8 of Fig. 6. However, this view is taken at a different period in the operation, the inner set of grippers being now in engagement with the sheet, instead of the outer set as in Figs. 6 and 7.

Fig. 9 is a diagram, illustrating the form and action of the gripper releasing cams.

Figs. 10 and 11 are detail views on a smaller scale of the guide holding and withdrawing levers, respectively.

Fig. 12 is a perspective view of one of the gripping members used with this form of the apparatus.

Figures 13, 14, 15, 16:
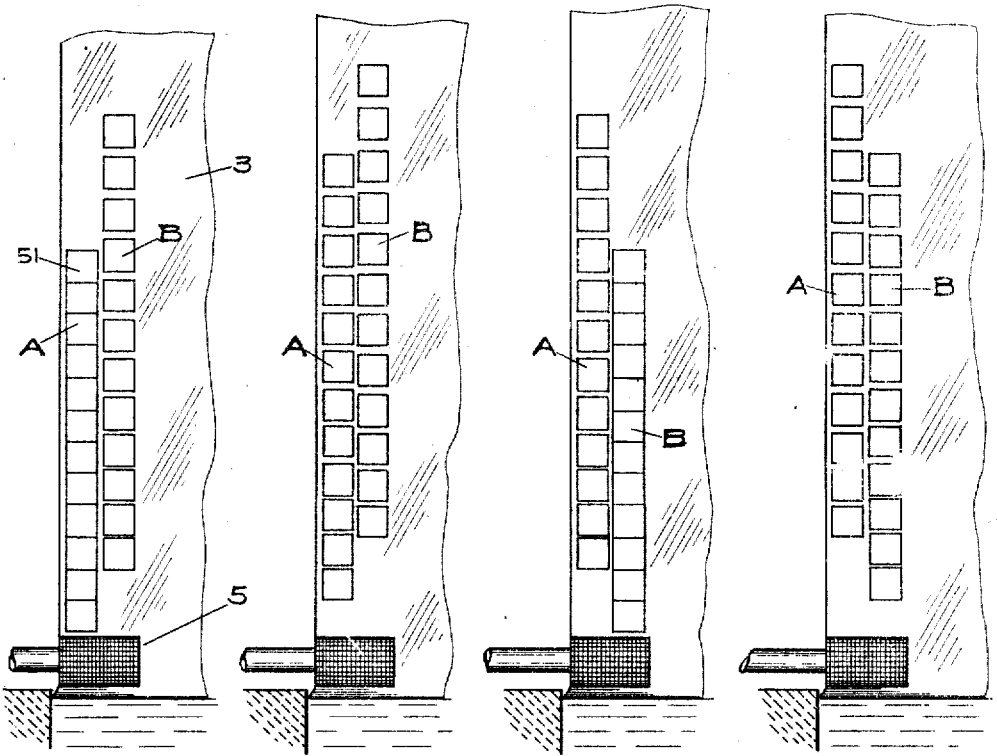
Figs. 13, 14, 15 and 16 are diagrammatic views showing the relative positions of the two adjacent sets of grippers at one edge of the sheet, at four successive equal periods of time, in one cycle of operations.

The modification illustrated in Figs. 1 to 5 will first be described. The draw-pot or receptacle 1, contains a supply of molten glass 2, which flows in from a continuous tank furnace or other suitable source. The glass sheet 3 is drawn upwardly from the molten glass 2, and, in the form illustrated, is bent over a cooled bending roll 4 into a horizontal plane, where it is carried off through suitable drawing mechanism into a leer. This is substantially the system disclosed in the Colburn patent referred to above, and it is to be understood that numerous temperature regulating devices are used at various points, which are here omitted from the dislosure for the sake of clearness. In the Colburn apparatus, a pair of edge forming rolls 5 are employed at or near the source of each edge of the sheet. These rolls not only feed the molten glass into the sheet edges, but form a cooler stiffer edge portion, and being run at a slower speed than the sheet is drawn, provide a drag or added tension on the edge portions of the sheet. This serves to hold the sheet substantially to width, and allows the process to be carried on continuously. However, the sheet does not entirely maintain its initial width, after leaving the edge forming rolls, but narrows away somewhat, as illustrated by the dotted line $a$ at the right of Fig. 1, due to the lengthwise stretch of the sheet, and the contraction while cooling. It is the object of the mechanism disclosed in this application to hold the sheet substantially to its initial width during its forming and cooling period, as illustrated by the edge line $b$ in Fig. 1. This will impart, during this period, a continuous lateral tension or stretch to the sheet, thus pulling out corrugations or wrinkles, and improving the quality and smoothness of the sheet surface.

With the apparatus as shown, the Colburn edge rolls 5 have been retained, but their principal function is now to form a uniform cool stiff edge on the sheet suitable to be engaged by the gripping mechanisms now to be described. Satisfactory results might be obtained if these edge rolls were omitted.

At each side of each edge of the sheet travels an endless series of individual and independent gripping members 6, of the general form shown in Fig. 5. These grippers may be either cast, or stamped from suitable sheet-metal, and comprise a flat engaging face 7 for gripping the glass sheet, and side arms 8 which extend partially around the guide loop 9. The engaging face 7 may be roughened or knurled as desired to insure more positive engagement with the glass sheet.

The width maintaining units at each edge of the sheet are substantial duplicates, except for some few parts which are reversed to provide for the right and left hand mechanisms, so that a description of one will suffice for both. The pair of guide loops 9 at one edge of the sheet, are located, when in operative position, in a substantially vertical plane, perpendicular to the plane of the sheet, one loop being at each side of the sheet. Each loop comprises a straight vertical portion 10, up which the grippers 6 travel with the sheet, a corresponding parallel portion 11 down which they return, and connecting arcs at the upper and lower ends of suitable curvature to allow the free passage therearound of the gripping members. Near the upper and lower ends of each loop are cross braces or spiders 12 and 13, from which extend upper and lower supporting arms or levers 14 and 15. The pairs of lever arms 14 and 15, are intermediately pivoted (as shown more particularly in Figs. 2 and 4), on the pivot pin or shaft 16, carried by supporting frame 17. Between the outer arms of levers 14 and the vertical web 18 of frame 17, are mounted expansion springs 19, normally acting to move the guide loops toward the sheet, and hold the gripping members yieldably in engagement with the sheet. The springs 19 surround a guide rod 20 having threaded ends on which are adjusting nuts 21 to limit the movement of the grippers toward the sheet. Similar springs are mounted between the arms 15 and the frame 18. One set of arms, (the upper arms 14 as shown), have handle extensions 22, for swinging the grippers away from the sheet when engaging or disengaging the mechanism therefrom. The disengaged position of one half of the device is indicated in dotted lines in Fig. 2.

In order to cool the loops, and grippers carried thereby, and maintain them at such a temperature that they will not stick to the glass sheet, water is circulated through that portion of the mechanism that comes in proximity to the hot glass. The cold water flows in through flexible pipe 23, through the lower lever arm 15, through spider 13, through the lower arc of loop 9, up through the guide portion 10, around the upper arc, and then out through spider 12, lever arm 14 and flexible outlet pipe 24. The direction of flow of the water is indicated by the small arrows in the drawings, see especially Fig. 3. The cooling system for each loop unit is complete in itself and entirely separate from the other loop of the pair.

The supporting frame 17 is pivoted near its lower end on a shaft 25 in base member 26, and the adjustment of frame 17, and the loops and gripping members carried thereby toward or from the vertical is accomplished by threaded adjusting nuts 29 and 30, through the vertical extension 31, on base 26. By suitably adjusting the nuts 29 and 30, the upward travel of grippers 6 may be inclined slightly either way from the vertical to vary the lateral tension applied to the sheet, as will be more fully explained hereinafter.

The gripping members 6 are not driven, but are carried upward along guides 10 by the sheet itself, while they slide back down the guides 11 under the influence of gravity.

It is necessary however to provide some means for carrying the idle grippers around the upper and lower arcs of the loops. Pivoted at the lower end of each loop, at one side of vertical arm 13' of spider 13, and concentric with the lower arc, is a sprocket wheel 32, of such a size, and having teeth so spaced that they will engage the inner ends of side arms 8 on the successive grippers 6 and move the grippers around the lower arc. Each sprocket 32 is connected by a sleeve 33 mounted on shaft 25, with a bevel gear 34 at the other side of spider 13. A horizontal cross shaft 35, pivoted in extension 36 of frame 17, carries at each end a bevel pinion 37, which in normal position of the loops meshes with and drives the bevel gear 34. Shaft 35 has keyed thereto a sprocket 38, driven by chain 39 from sprocket 40 keyed at one end of shaft 25. The other end of shaft 25 is driven by bevel gears 41 and 42 from a shaft 43 pivoted in ears 44 on base 26. Gear 45 on shaft 43, meshes with one of a pair of intermeshing gears 46 on the drive shafts 47 for the knurled edge rolls 5. In this way the edge rolls 5 and the driving sprockets 32 may both be driven from a common source of power, although it is obvious that separate drives could be used if so desired.

At the upper end of each loop 9 an idle sprocket 48, similar to sprocket 32, is pivoted at one side of vertical arm 12' of spider 12. This sprocket serves to carry the successive grippers 6 around the upper arc of the guide. At least one gripper 6, still in driven engagement with the glass sheet 3, will always engage the sprocket 48, and will move the sprocket, as well as the idle grippers then on the upper arc of the loop.

In operating this apparatus, the drawing of the glass sheet is started by means of a bait as is usual with similar mechanisms. At this time the width-maintaining mechanisms have been moved back out of the way, the supporting bases 26 being movable toward and from the pot 1, along slideways 49 on stationary supports 50. As soon as the sheet has been started the units at each edge of the sheet are moved into position, the loops and grippers being held away from engagement with the sheet by moving the handles 22 toward one another. It will be noted that at this time the bevel gears 34 are out of mesh with bevel pinions 37, as swing shown in dotted lines in Fig. 2. The edge rolls 5 are first adjusted into proper working engagement with the sheet, and then by releasing the handles 22, the springs 19 are allowed to bring the gripping members 6 into engagement with the opposite sides of the sheet edge. These grippers 6 grip the sheet in pairs, one at each side of the sheet, and move upwardly therewith. As the grippers are forced to slide up along the guide 10, the sheet is held out to the line of this guide and is not permitted to contract. By properly adjusting the nuts 29 and 30, the inclination of the guides 10 may be varied as desired to adjust the lateral tension applied to the sheet. At the left of Fig. 1, the guides are shown in dotted lines inclined outwardly, so that the sheet will be increased in width as it is drawn up. However, if the guides are maintained substantially vertical so as to keep the sheet to its initial width and resist the contracting tendency, sufficient lateral tension or stretch will usually be obtained. It may even be found desirable to decrease this tension slightly by inclining the guides inwardly. Any of these adjustments may be accomplished with the mechanism shown.

As the sheet is drawn upwardly from the molten bath it is stretched longitudinally, and to allow for this stretch the grippers are made as a series of entirely separate and independent units. At the lower ends of the loops where the grippers engage the sheet they are in close contact with one another, but as they move up with the sheet they separate as the sheet stretches or extends, as indicated in Fig. 3. To allow for this play between the separate grippers, the series is not sufficiently complete to cover the entire loop, but a blank space will be left on the down-stretch 11 of the loop. The grippers will successively close this gap as they fall down the guide 11.

Another variation of the apparatus for carrying out this invention is illustrated in Figs. 6 to 16. In this modification the parts 1 to 5, employed in the normal sheet drawing operation, are the same in form and function as in the apparatus previously described. In the form of width-maintainer here used, the sheet edge grippers 51, instead of moving continuously in an elliptical orbit, as in Figs. 1 to 5, reciprocate up and down along a single guide member, being in engagement with the glass sheet as they move up, and out of engagement as they move down.

The individual grippers 51 are preferably of about the form shown in Fig. 12, although obviously this form may be varied as found convenient. These gripping members slide freely on guides 52 or 53, there being a pair of guides 52 adjacent the sheet edge, and a second pair of parallel guides 53 directly behind the guides 52, as shown in Figs. 6, 7 and 8. A series of grippers 51 move up and down on each guide 52 or 53, the series being in all respects identical on each guide. Each guide 53 is carried by a pair of supporting levers 54 and 55, quite similar in form and function to the levers 14 and 15, described in connection with Figs. 1 to 5. The levers 54 and 55 are intermediately pivoted on a vertical shaft 56 carried by supporting frame 57. In like manner the guides 52 are carried by levers 58 and 59, also pivoted on shaft 56. Between the outer end of each lever 54, 55, 58 and 59 and web extensions on the frame 57, are expansion springs 60, mounted on guide rods 61, and having their expansion limited by adjusting nuts 62. These springs will normally hold each series of gripping members 51 yieldably against the glass sheet 3.

The guides 52 or 53 are hollow and water-cooled, the water flowing into each guide through a flexible connection 63 to the lower lever arm 55 or 59, up through the guide and out through the lever arm 54 or 58, and through a flexible outlet 64 connected therewith. Cross-sections through the cooling systems are indicated at 65 in Figs. 7 and 8.

About midway of the height of guides 52 are connected a pair of lever arms 66, and a similar adjacent pair of lever arms 67 connect with guides 53. These levers 66 and 67 are also pivoted on shaft 56, but, unlike the levers 54, 55, 58 and 59, they cross one another at the pivot, (see Fig. 11), so that separation of the outer ends of these levers will disengage the gripping members from the glass sheet 3. At substantially the same height as levers 66 and 67, a horizontal shaft 69 is rotatably mounted in frame 57, the outer end of the shaft being journaled in a bracket 70 projecting outwardly and upwardly from the frame. This shaft 69 is driven from any suitable source of power by means of a sprocket 71 keyed to its outer end. Keyed on this shaft, opposite the respective ends of levers 66 and 67, are a pair of similar cams 72 and 73. Each cam is of generally concentric cylindrical form with two raised operating projections 74 at diametrically opposite points, as indicated more clearly in Fig. 9. The projections 74 on cam 72 are located at 90° to those on cam 73. In this way one or the other of the cams will operate at every quarter revolution of shaft 69. At the ends of levers 66 are pivoted rollers 75, traveling on the circumference of cam 72, while similar rollers 76 on the ends of levers 67, operate against cam 73. The levers 67 have upwardly extending elbows 77 at their ends, which carry rollers 76, so that both sets of rollers 75 and 76 will lie in the horizontal plane passing through the axis of shaft 69. Each projection 74 has a sharp rise $a$ to insure quick disengagement of the gripping members 51, and a gradual decline $b$, to lower the grippers gently onto the sheet. (See Fig. 9.)

To facilitate an understanding of the operation of this mechanism, let us assume that the glass sheet is being drawn up at the rate of 60 inches per minute, or 1 inch per second. Assume that each gripper 51 is one inch in height, and that shaft 69 and cams 72 and 73, are rotated at the constant speed of one rotation in 8 seconds. Each projection 74 extends through 45° of the cam surface, or one-quarter of each half of the cam. Taking cam 73 for example, during each 180° or 4 seconds time of its travel, the rollers 76 will be raised, and hence the grippers 51 will be disengaged from the sheet 3, for 45° or one second time. While the rollers 76 are traveling on the 135° of cylindrical surface of the cam (for 3 seconds time), the grippers 51 will be in engagement with the sheet and moving upwards therewith. This will provide a total upward travel of something in excess of three inches for each set of grippers, the excess being due to the longitudinal stretch of the sheet, which separates the pairs of grippers, as indicated in the drawings. It will be understood that the dimensions and times specified above are taken merely by way of example, and may be varied as desired.

In operation, the corresponding sets of grippers on opposite faces of the sheet operate simultaneously, so that the gripping members 51 will engage the sheet in pairs, and travel upwardly therewith. Since the cams operate the two sets of grippers at staggered intervals, one set of grippers is always in engagement with the sheet edge, and one-half of the time both sets are in engagement. The cycle of operations may be more clearly understood in connection with the diagrammatic views of Figs. 13 to 16. These views illustrate the position of the grippers at one second intervals, using the same proportions and times assumed above. In Fig. 13, the outer set of grippers A have just come into engagement with the sheet, whereas the inner set B have been in engagement for two seconds, and have reached the elevation indicated, the pairs of gripping members having separated as the sheet stretched longitudinally. During the succeeding second the two sets both move up with the sheet to the positions shown in Fig. 14. Set B has now reached the extreme height of its travel, and at this time cam 73 raises the rollers 76 and moves guides 53 away from the sheet. The gripping members 51 comprising set B now fall to the bottom of guide 53 assuming their original starting position, as shown in Fig. 15. The one second time while this set is out of engagement with the sheet is more than ample for the grippers to fall back under the influence of gravity. At the end of this second, projection 74 on cam 73 runs out from under rollers 73 and the grippers 51 comprising set B are again moved into engagement with the sheet. During this second time interval, set A has remained in engagement with the sheet and has moved up to the position shown in Fig. 15. In the next second interval both sets move up to the respective positions shown in Fig. 16. At this time set A has reached the upper limit of its travel, and cam 72 lifts the rollers 75, disengaging the gripping members 51 on guides 52. Set A then falls back to the starting position shown in Fig. 13. At the end of the next second, set B has moved up to the position shown in Fig. 13, and projections 74 on cam 72 moving out from under rollers 75 again allow the springs 60 to engage the gripping members on guides 52 with the sheet, and the cycle of operations just described starts over again.

The supporting frame 57 is pivoted at 78 to a base 79 adjustable in and out along slideways 80 on supports 81, all substantially the same as in the modification first described. Threaded bolt 27, carrying adjusting nuts 29 and 30 is mounted in an upwardly extending portion 82 of base 79. Just as in the modification first described, the inclination of the guides 52 and 53, and hence the line of travel of the gripping members may be varied as desired by adjusting the positions of the nuts 29 and 30.

Figure 17:
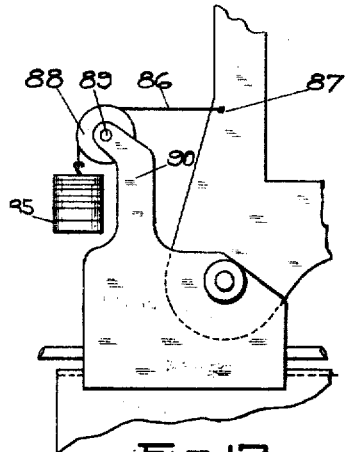
Figs. 17 and 18 are fragmental side elevations, showing alternative forms of adjusting means for varying the inclination of the gripper supporting frame.
Figure 18:
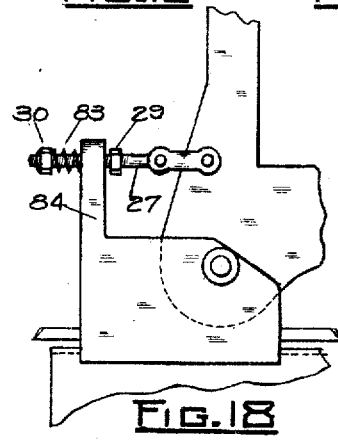

Figs. 17 and 18 indicate possible variations of this means for adjusting the inclination of the guides. In Fig. 18 a compression spring 83 is mounted on threaded rod 27 between nut 30 and the fixed support 84. This will give a yieldable lateral tension on the sheet edge, which may be varied by moving the nut 30 in or out along the threaded rod 27. Nut 29 acts as a limit stop for the outward pull of the spring.

In Fig. 17 the same results are obtained by the use of adjustable weights 85, suspended by cable or chain 86 attached at its other end 87 to the pivoted supporting frame 17 or 57, and passing over a pulley 88 pivoted at 89 to the portion 90 of the supporting base. The modifications shown in Fig. 17 or 18 could obviously be used with either form of the width-maintaining apparatus.

It will be noted that either form of this apparatus provides a mechanism for continuously holding out the edges of the sheet and stretching the sheet laterally, throughout the forming period, without interfering with the natural longitudinal elongation of the sheet as it is drawn from the molten bath. In other words, the entire plastic area of the sheet is continuously stretched in both directions thus insuring a smooth flat sheet.

The weights of the several gripping members, which is inconsiderable, as well as the resistance to the sliding of these grippers along the guides, act as a drag on the edges of the sheet, which is desirable, and is a function performed in the present Colburn process by the slowly rotating rolls 5. For this reason the rolls 5 may be omitted if so desired, or if retained they need only serve as a sheet edge forming means.

Instead of being straight as shown, the guides 10, 52 or 53 might be slightly curved to vary the lateral tension at different points along the sheet.

Claims:

1. In the process of drawing continuous sheet glass, the step of maintaining the sheet at a predetermined width from near the draw point until the sheet is set, while simultaneously elongating the sheet to size.

2. In drawing continuous sheet glass, the process of simultaneously stretching substantially the entire area of the plastic sheet before it has become set, both longitudinally and laterally, while the sheet is in motion and more of the sheet is being drawn from the molten source.

3. In drawing sheet glass, the process of holding the sheet edge to a predetermined path of travel, while simultaneously stretching the edge longitudinally.

4. In drawing sheet glass, the process of holding the sheet edge to a predetermined path of travel, while the edge is being simultaneously elongated by stretching the plastic glass lengthwise.

5. In combination with a source of molten glass, and means for continuously drawing a sheet of glass therefrom, a substantially continuous series of grippers at each edge of the sheet throughout its plastic zone for holding the sheet to width while the sheet in this plastic zone is elongating.

6. In combination with a source of molten glass, and means for continuously drawing a sheet of glass therefrom, means engaging and moving with each edge of the sheet throughout the plastic zone for holding the sheet to width while the sheet in this plastic zone is elongating.

7. In combination with a source of molten glass, and means for continuously drawing a sheet of glass therefrom, a substantially continuous series of grippers at each edge of the sheet engaging and moving with the sheet throughout its plastic zone, and guides for the grippers, whereby the forming sheet is compelled to stretch laterally while it is being drawn and the plastic portion is elongating.

8. In combination with a source of molten glass, and means for continuously drawing a sheet of glass therefrom, a series of independently movable grippers adapted to engage and be carried along by the sheet edges throughout the plastic zone of the sheet, and means to guide the grippers and engage and disengage them from the sheet.

9. In combination with a source of molten glass, and means for continuously drawing a sheet of glass therefrom, a series of independent grippers adapted to engage and be carried along by the sheet edges throughout the plastic zone of the sheet, means to guide the grippers and engage and disengage them from the sheet, and cooling means for the grippers and guides.

10. In combination with a source of molten glass, and means for drawing a sheet of glass therefrom, a series of independently movable sheet-edge-gripping devices, means for feeding the gripping devices successively into engagement with the sheet edge near its source, means for guiding the gripping devices as they are carried along by the sheet, and means for releasing the gripping devices from the sheet and returning them to their starting position.

11. In combination with a source of molten glass, and means for drawing a sheet of glass therefrom, a series of sheet-edge-gripping devices, means for feeding the gripping devices successively into engagement with the sheet edge near its source, means for guiding the gripping devices as they are carried along by the sheet, means for releasing the gripping devices from the sheet and returning them to their starting postition, and means for cooling the guides and gripping devices.

12. In combination with an apparatus for drawing sheet glass from a supply of molten glass, width-maintainers engaging and moving with the edges of the sheet, guides for the width-maintainers, and means for adjusting the inclination of the guides with respect to the line of travel of the sheet.

13. In combination with an apparatus for drawing sheet glass from a supply of molten glass, width-maintainers engaging and moving with the edges of the sheet, guides for the width-maintainers, and yieldable means for varying the inclination of the guides with respect to the line of travel of the sheet.

14. In combination with an apparatus for drawing sheet glass from a supply of molten glass, width-maintainers engaging and moving with the edges of the sheet, and means for exerting a constant lateral tension on the width-maintainers to enforce a lateral extension of the sheet while it is being drawn longitudinally.

15. In combination with a source of molten glass, and means for continuously drawing a sheet of glass therefrom, a continuous series of independent gripping members moving in pairs at the opposite sides of each edge of the sheet, a guide for each series of grippers, a supporting frame on which each pair of guides is pivoted, spring means between the frame and guides for holding the grippers yieldably against the sheet, a supporting base to which the frame is pivoted, and an adjustable connection between the frame and base for varying the inclination of the guides with respect to the line of travel of the sheet.

16. In combination with a source of molten glass, and means for continuously drawing a sheet of glass therefrom, a continuous series of independent gripping members moving in pairs at the opposite sides of each edge of the sheet, a water cooled guide for each series of grippers, a supporting frame on which each pair of guides is pivoted, spring means between the frame and guides for holding the grippers yieldably against the sheet, a supporting base to which the frame is pivoted, and an adjustable connection between the frame and base for varying the inclination of the guides with respect to the line of travel of the sheet.

17. In combination with a source of molten glass, and means for drawing a sheet of glass therefrom, a pair of guide loops, a series of grippers freely slidable on each loop, a frame yieldingly holding the loops and grippers, one against each side of an edge of the glass sheet, a supporting base to which the frame is pivoted, and means for angularly adjusting the frame about its pivot to vary the inclination of the guide loops with respect to the line of travel of the glass sheet.

18. In combination with a source of molten glass, and means for drawing a sheet of glass therefrom, a pair of guide loops, a series of grippers freely slidable on each loop, a frame yieldingly holding the loops and grippers, one against each side of an edge of the glass sheet, means for cooling the loops, a supporting base to which the frame is pivoted, and means for angularly adjusting the frame about its pivot to vary the inclination of the guide loops with respect to the line of travel of the glass sheet.

19. In combination with a source of molten glass, and means for drawing a sheet of glass therefrom, a pair of guide loops, a series of grippers freely slidable on each loop, means for feeding the grippers around the lower arc of each loop into engagement with the sheet, a frame yieldingly holding the loops and grippers, one against each side of an edge of the glass sheet, means for cooling the loops, a supporting base to which the frame is pivoted, and means for angularly adjusting the frame about its pivot to vary the inclination of the guide loops with respect to the line of travel of the glass sheet.

20. In combination with a source of molten glass, and means for drawing a sheet of glass therefrom, a pair of guide loops, a series of grippers freely slidable on each loop, a driven sprocket for feeding the grippers around the lower arc of each loop into engagement with the sheet, an idler sprocket for enforcing uniform movement of the grippers around the upper arc of each loop, a frame yieldingly holding the loops and grippers, one against each side of an edge of the glass sheet, means for cooling the loops, a supporting base to which the frame is pivoted, and means for angularly adjusting the frame about its pivot to vary the inclination of the guide loops with respect to the line of travel of the glass sheet.

21. In combination with a source of molten glass, and means for drawing a sheet of glass therefrom, a pair of rollers adjacent the molten source for forming each edge of the sheet, series of width maintaining members engaging the sheet above the rollers and traveling with the sheet until it has become set, the members being separable from one another to allow the sheet to stretch longitudinally, water-cooled guides for the width maintaining members, and supporting means for the guides.

22. In combination with a source of molten glass, and means for drawing a sheet of glass therefrom, a pair of rollers adjacent the molten source for forming each edge of the sheet, a series of width maintaining members engaging the sheet above the rollers and traveling with the sheet until it has become set, the members being separable from one another to allow the sheet to stretch longitudinally, water-cooled guides for the width maintaining members, supporting means for the guides, and means for varying the inclination of the guides with respect to the line of draw of the sheet.

Signed at Toledo, in the county of Lucas, and State of Ohio, this 9th day of May, 1921.

CLIFFORD A. ROWLEY.